United States Patent
Enbom

(10) Patent No.: US 7,261,818 B1
(45) Date of Patent: Aug. 28, 2007

(54) METHOD FOR THE FABRICATION OF A PLEATED FILTER

(75) Inventor: Kjell Enbom, Vagnhärad (SE)

(73) Assignee: Camfil AB (SE)

( * ) Notice: Subject to any disclaimer, the term of this patent is extended or adjusted under 35 U.S.C. 154(b) by 0 days.

(21) Appl. No.: 10/239,550

(22) PCT Filed: Mar. 24, 2000

(86) PCT No.: PCT/SE00/00590

§ 371 (c)(1),
(2), (4) Date: Sep. 23, 2002

(87) PCT Pub. No.: WO01/72399

PCT Pub. Date: Oct. 4, 2001

(51) Int. Cl.
*B01D 29/07* (2006.01)
*B01D 27/06* (2006.01)

(52) U.S. Cl. ............... 210/493.5; 55/475; 55/500; 156/83; 210/493.1; 210/508; 493/331; 493/941

(58) Field of Classification Search ............ 210/493.1, 210/493.5, 496, 506, 508; 55/475, 500, DIG. 5; 493/331, 333, 941; 156/79, 83, 474; 264/DIG. 48
See application file for complete search history.

(56) References Cited

U.S. PATENT DOCUMENTS 3,025,202 A * 3/1962 Morgan et al. ............ 264/45.3
3,633,756 A * 1/1972 Buckman .................. 210/443
4,890,444 A * 1/1990 Vander Giessen et al. .... 55/498
5,071,555 A * 12/1991 Enbom .................... 210/493.5
5,240,479 A * 8/1993 Bachinski .................. 96/17
6,120,633 A * 9/2000 LeMaster ................... 156/181

FOREIGN PATENT DOCUMENTS

| EP | 0 377 419 | 7/1990 |
| EP | 0 377 420 | 7/1990 |
| EP | 0 643 115 A2 | 3/1994 |
| EP | 0 948 986 A1 | 10/1999 |
| JP | 6-057224 | 1/1994 |

* cited by examiner

*Primary Examiner*—John Kim
(74) *Attorney, Agent, or Firm*—Hayes Soloway P.C.

(57) ABSTRACT

A filter is made by the folding of a filter media to pleats after the application of strings of glue thereon and the glue serves as distance elements and fixing for the filter media. The glue contains an expandable filler, that when heated expands to a larger size that is then permanent. When the glue has set the filter is heated and the filler expands and expands the filter pleats.

17 Claims, No Drawings

METHOD FOR THE FABRICATION OF A PLEATED FILTER

This application is a 371 PCT/SE00/00590 filed Mar. 24, 2000.

BACKGROUND OF THE INVENTION

A practical and economic way to produce filters is to use strings of melted glue on a filter media that is then folded so that the still melted glue fixes to the folds together prior to hardening. The melted glue simultaneously serves as distance elements and a fixture resulting in a filter matrix that then can be arranged in a frame to produce a filter. From EP 89850002.0, it is known to use intermittent strings to produce folded filters with folds having a very precise wedge shape to give optimal flow conditions. From EP 89850003.8 it is further known to use the very same glue strings that are used to hold the folds together to provide the folded filter matrix with a flat filter media membrane on the exit side. This promotes a very even flow from the filter and thus it can be used at clean room work stations.

Although the melted glue string filters have many good properties and enable practical fabrication solutions they are not free from drawbacks. One such drawback is that in reality it is not always easy to control the temperature conditions at all the individual nozzles for the melted glue. This means that the dispensed amount and its shape on the filter media will vary and thus the quality of the filter. A second drawback is that the glue strings have a rather limited span of dimension possibilities leading to an almost standardized size for the folds or distances between them. A third drawback is the cost. In a glue string filter matrix a major part of the cost is that of the glue. Also a major part of the material in filter will be the glue, which is a drawback at recycling and also from the point of fire conditions since the glue will easily burn even if the filter material is glass.

From the above it is apparent that further development would be welcome and needed.

SUMMARY OF THE INVENTION

The object of the present invention is to eliminate and reduce some of the aforementioned drawbacks. In accordance with the present invention, this is done by using a glue with an expandable filler. Using a glue with expandable fillers, the volume of the glue used is reduced, the cost of glue diminished and the amount of burnable matter decreased, while simultaneously achieving a good control of the glue strings and the distance between the filter media pleats.

Embodiments of the present invention provide a device and method for adhering together filter material.

Briefly described, one embodiment of the system, among others, can be implemented as follows. A glue for folded filter comprises:

intermittent strings of glue
wherein said glue contains an expandable filler.

Preferably, the expandable filler is constituted of microspheres. The expansion of the microsphere is preferably triggered independently of the administration and drying of the glue. The glue or adhesive may be expanded by heat and the glue may be solvent based.

In another embodiment, a filter or filler seal comprises a tape or strip and a glue. The glue contains expandable microspheres, as described above. The filter material may be pleated with the glue holding the pleats together at the ends.

The present invention can also be viewed as providing a method for fabricating filters or pleated filters. In this regard, one embodiment of such method, among others, can be broadly summarized by the following steps:

providing a filter material;
applying an adhesive containing expandable fillers with the expandable fillers comprising microspheres; and
triggering the expansion of said expandable fillers independent of the administration and drying of said adhesive.

Other systems, devices, methods, features and advantages of the present invention will become apparent to one skilled in the art upon examination of the following detailed description. It is intended all such systems, devices, features and advantages be included within this description, be within the scope of the present invention, and be protected by the accompanying claims.

DETAILED DESCRIPTION OF THE INVENTION

According to a first preferred embodiment of the present invention, a glue or adhesive with expandable filler is used. The expandable filler used may be expandable microspheres or some other filler with an expansion that can be triggered on demand. The expandable microspheres may be constituted by minute thermoplastic gas filled balloons. When these balloons are heated, plastic expansion occurs and the material becomes plastic at the same time as the gas expands. Thus, an increased volume results from the heating of the balloons. These type of microspheres are for instance sold by Casco Products.

Preferably, the glue is solvent based. This means that the precision in the administration of the glue can be increased since working conditions are more easily maintained at constant values throughout the filter matrix and also over time. Since the viscosity is much lower for solvent-based glue than for melted glue the glue can be administrated in extremely precise patterns, particularly since the viscosity of solvent based glues are much less temperature dependent.

This precision also means that extremely fine folds can be made and retained. This also means that a large filter area can be achieved, and extremely small filters can be produced.

In the case of an expandable filler in a melted glue, the expandable filler may have been admixed and expanded before administration or may be added and expanded simultaneously. For instance this can be done for strings on a filter material. Alternatively, a method, other than increasing the temperature, may be used to trigger the expansion.

Preferably, the expandable filler is unexpanded when applied to the filter media and expanded at a later stage. In a preferred embodiment, the glue can be set or solidified before the expanding of the filler. For instance, the solvent can be vented away from the glue when the filter material is still straight and unfolded. The filter material is then folded and the still tacky glue strings adhere to each other and the opposing filter media. Then, the filler material is expanded so that the pleats open up to the intended width. Since the glue can be administered with great precision, the opening of the filter material forces the folds to conform and thus creates an even flow through the filter. The glue may also be of the type that becomes tacky when heated at the expansion.

In another preferred embodiment, the glue is a waterbased vinyl or acrylic glue to which microscopic temperature expandable spheres have been added. The glue with its spheres is administered as in conventional glue string filters and the glue is dried by subjecting it to infrared light, microwaves or hot air. Preferably, the glue remains tacky after drying or becomes tacky as temperature is increased. The filter material is folded, and then the filter's temperature is raised to 90–100° C. At this temperature, the microscopic spheres expand pressing the folds apart or filling up the distances between the folds.

In addition to improving the production quality of glue string filters, this method also allows the filter matrix production to be temporarily stopped before the filler expansion. The filler expansion may then be carried out at a later stage and even at some other location. This means that the folded filter material can be transported in a more compact and space saving form, that will also be less vulnerable to destruction. The filter matrix can then be expanded directly at its final location, perhaps even without having to mount the filter in a separate frame. The resilience of the filler allows increased tolerances and thus precise fitting will be easily accomplished.

In another preferred embodiment of the present invention, instead of fitting the filter matrix in its frame or opening, a tape or strip can be provided wound around the expandable filter matrix. The tape or strip is then inserted in its frame or an opening in a machine. The filler is then expanded, sealing the filter relative to its framework. Here where the expandable glue is also intended to serve as a seal more glue may be applied to the filter after its expansion. When the glues serves only as a distance element, this is not necessary and the glue content can be reduced. It is in fact conceivable to cover the inlet and outlet sides of the unexpanded filter matrix with a sufficiently small amount of expandable glue so that the structure is air permeable when expanded together with the filter folds. Therefore, the filter material is further protected in its folded stage when transported and the expansion of the pleats is better controlled.

Since the expandable filler will have a very low density in its unexpanded state, gravity can be used to concentrate the glue.

Since the adherence of the glue and the expansion of the spheres have so differing conditions for execution, the expanding of spheres can be performed at a later time and a ready filter matrix can even be compactly transported and at the mounting of the matrix the spheres may be expanded. This expansion can be done by increasing the temperature so that the spheres expand and press the filter folds apart so that the filter matrix as a whole expands and fills out a filter frame. The filter frame may even be integral with some apparatus or machine during this step. This method allows for savings in the way of transportation in space and small series applications since the matrix can adopt to different frames, opening sizes or even shapes. A self-adhering or tacky glue can be used or even a glue that when heated with the expansion of the filler becomes tacky.

Alternatively, the distance elements in the filter matrix may be expanded and then cut into a suitable size for the matrix. These filter matrixes are then provided with a surrounding sealing edge, which contains microspheres that can be expanded at a later stage. For instance, at the mounting of the filter the microspheres may be expanded.

Since the expansion is independent of the drying, it is also possible to apply glue in several different steps with expansion occurring between the applications of glue. The expansion can also be one when all filler material is expanded. In this way, different mixtures can be applied at different locations with different purposes and percentages. For instance, successive essentially identical glue depositions can be made considerably thicker for the distance elements. This means that the glue string filters are larger with wider openings between the pleats.

By using a comparatively low microsphere content and or small microspheres, the distance between the pleats can be set to the thickness of a single sphere. This allows creation of ultra small filters from, for instance, expanded PTFE with a surprisingly large filter area for their size. Filters for disc drives, computers and small machines and the like can be fabricated in this way.

It is also known to arrange an air permeable membrane shortly after a filter in order to obtain a flow resistance a short distance downstream of the pleated filter. The passing air can move laterally so that the pressure over the entire filter area will become more uniform. With the adhesive method of this present invention, this distance can be achieved quite simply by gluing the flat sheet to the pleats using a glue with expandable filler. When the filler is expanded, an intermediate space for lateral transport is achieved in an extremely simple manner. By expanding the filler before the glue is entirely set, a simple fixture or restriction for the lifting of the flat sheet, i.e. a very even surface, can be obtained.

It should also be mentioned that in comparison to the prior art, the wear and tear on tools is far less with this method. This method also reduces fabrication cost. The costs are reduced by decreasing the amount of glue used and even though the microspheres are comparatively expensive.

It should further be mentioned that the microspheres can be destroyed by subjecting them to an increased temperature. This means that the filter after use can be destroyed by heating it so that it shrinks, which also will reduce the space needed when transporting it to recycling, as well as prevent its reuse.

Even if one of the major advantages of the invention lies in the possibility to postpone expansion, expanding may take place simultaneously with administration of the glue.

The filler may not necessarily have to be added to the glue in advance, but instead one can consider mixing more or less simultaneous with the administration of the glue on the filter media. Also the glue need not be seen as the main component of the glue strings in their unexpanded state. Instead, the glue content be reduced so that the expandable filler, possibly in the shape of microspheres, have a coating of glue for the adhering to each other and the filter material. This can for instance be controlled by the way in which mixing is done and the amount of solvent in the glue.

In a further embodiment of the invention, a filter media is folded into pleats. The pleats are essentially compressed and held together with a layer with embedded expandable filler bodies, for instance, in the shape of microspheres, and a comparatively small amount of solvent based glue. The glue is applied to the filter faces at the tips of the pleats. The glue is dried and then the filler is expanded, opening up the filter pleats at the same time as the layer is expanded so that it becomes air permeable. In this way, the filter may be self-contained and sealed until it is ready for use.

Instead of using a layer of glue and filler over the filter media, glue strings may be used that are only in contact with the tips of the compressed pleated filter media. The glue is hardened and then the strings are heated and expanded, which means that they become longer and open up the filter pleats.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modification and variations are intended to be included herein within the scope of the disclosure and the present invention and protected by the following claims.

The invention claimed is:

1. A method for the fabrication of a pleated filter comprising the steps of:
   providing a pleated filter material having an adhesive comprising a filer material containing expandable microspheres applied between pleats to hold adjacent pleats together; and,
   expanding said pleated filter material to open the pleats by triggering an expansion of said expandable microspheres independent of the administration and drying or setting of said adhesive.

2. The method according to claim 1, wherein the adhesive is dried or set before the microspheres are expanded.

3. The method according to claim 1, wherein the filter material is folded into pleats after the adhesive is applied, and the adhesive is then set, and the microspheres are expanded immediately after the adhesive is set.

4. The method according to claim 1, wherein the filter material is folded into pleats after the adhesive is applied, and the adhesive is then set, and the microspheres are expanded some time after the adhesive is set.

5. The method according to claim 1, wherein the adhesive is dried or set after or simultaneously with expansion of the microspheres.

6. The method according to claim 1, including the step of mounting the filter in a frame, wherein the microspheres are expanded as the filter is being mounted in a frame.

7. The method according to claim 1, including the step of mounting the filter in a frame, wherein the microspheres are expanded after the filter is mounted in a frame.

8. The method according to claim 1, wherein after the adhesive is applied, expanded and set, additional adhesive with expandable microspheres is applied at the same locations as the first application of adhesive.

9. The method according to claim 3, wherein the adhesive is set after the filter material is transported to its intended place of use.

10. A method for the fabrication of a pleated filter comprising the steps of:
    providing a filter material;
    applying strings of adhesive to selected areas of said filter material, wherein said adhesive comprises a filler material containing expandable microspheres;
    folding said filter material into pleats with said strings of adhesive between said pleats; and
    increasing a cross-section of said strings of adhesive to increase the distance between said pleats by triggering an expansion of said expandable microspheres independent of the administration and setting of said adhesive.

11. A method according to claim 10, wherein said microspheres are expanded to increase the cross section of the adhesive strings before the adhesive is fully dried or set.

12. A method according to claim 10, wherein said folding is carried out after or simultaneously with said expansion.

13. A method according to claim 10, wherein said expansion is triggered by heat.

14. A method according to claim 10, wherein said adhesive is solvent based.

15. A method according to claim 10, wherein said adhesive is a hot melt glue having a curing temperature above that of an expansion triggering temperature of said microspheres.

16. A method according to claim 10, further comprising the step of mounting said pleated filter in a frame, wherein expansion of said filler material is effected after or simultaneous with said mounting.

17. A method according to claim 10, further comprising the steps of
    applying additional adhesive containing expandable microspheres on top of said strings of adhesive before said strings of adhesive are fully set; and
    increasing the distance between said pleats by triggering an expansion of said expandable microspheres in said additional adhesive independent of the administration and setting of said additional adhesive.

* * * * *

UNITED STATES PATENT AND TRADEMARK OFFICE
CERTIFICATE OF CORRECTION

| | | |
|---|---|---|
| PATENT NO. | : 7,261,818 B1 | |
| APPLICATION NO. | : 10/239550 | |
| DATED | : August 28, 2007 | |
| INVENTOR(S) | : Kjell Enbom | |

It is certified that error appears in the above-identified patent and that said Letters Patent is hereby corrected as shown below:

Claim 1, Column 5, line 11, "filer" should be --filler--.

Signed and Sealed this
Twelfth Day of July, 2011

David J. Kappos
*Director of the United States Patent and Trademark Office*